(12) United States Patent
Cody et al.

(10) Patent No.: US 11,782,522 B1
(45) Date of Patent: Oct. 10, 2023

(54) METHODS AND SYSTEMS FOR MULTIMODAL HAND STATE PREDICTION

(71) Applicants: Roya Cody, Markham (CA); Da Yuan Huang, Markham (CA); Xiang Cao, Toronto (CA); Wei Li, Markham (CA)

(72) Inventors: Roya Cody, Markham (CA); Da Yuan Huang, Markham (CA); Xiang Cao, Toronto (CA); Wei Li, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/704,970

(22) Filed: Mar. 25, 2022

(51) Int. Cl.
*G06F 3/0346* (2013.01)
*G06F 3/0354* (2013.01)
*G06F 3/044* (2006.01)
*G06F 3/01* (2006.01)

(52) U.S. Cl.
CPC ............ *G06F 3/0346* (2013.01); *G06F 3/017* (2013.01); *G06F 3/03545* (2013.01); *G06F 3/044* (2013.01)

(58) Field of Classification Search
CPC .... G06F 3/03545; G06F 3/0346; G06F 3/044; G06F 3/017; G06F 3/011; G06F 30/27
See application file for complete search history.

(56) References Cited

U.S. PATENT DOCUMENTS

| | | | |
|---|---|---|---|
| 2003/0156756 A1* | 8/2003 | Gokturk | G06V 40/11 382/190 |
| 2008/0211766 A1 | 9/2008 | Westerman et al. | |
| 2013/0300659 A1* | 11/2013 | Kang | G06F 3/017 345/158 |
| 2016/0011718 A1* | 1/2016 | Krulce | G06F 3/0416 345/173 |

(Continued)

FOREIGN PATENT DOCUMENTS

| CN | 106575200 A | 4/2017 |
|---|---|---|
| CN | 106598243 A | 4/2017 |

(Continued)

OTHER PUBLICATIONS

Siio, Itiro, and Hitomi Tsujita. "Mobile interaction using paperweight metaphor." Proceedings of the 19th annual ACM symposium on User interface software and technology. 2006.

(Continued)

*Primary Examiner* — Darlene M Ritchie (57) ABSTRACT

In various examples, the present disclosure describes methods and systems for generating hand state predictions. A hand state prediction system includes a machine learning-based model, such as a neural network model, that is trained to convert inertial motion measurements and surface contact data into predictions of a corresponding hand gesture or gripping posture. For each window of data sampled, motion data and contact data are obtained, processed and fused to generate a fused prediction. The hand state prediction sys- (Continued)

tem can operate in continuous mode to automatically detect a start and an end of a hand action, or a user can designate a start and an end of a hand action. A hand state prediction is generated by a multimodal classifier by processing the fused prediction. Instructions represented by a hand action can be acted upon through a command action performed by a computing device or a computer application.

19 Claims, 7 Drawing Sheets

(56) References Cited

U.S. PATENT DOCUMENTS

| | | | | |
|---|---|---|---|---|
| 2018/0364813 | A1* | 12/2018 | Sayah | G06F 3/0346 |
| 2020/0184204 | A1* | 6/2020 | Freedman | G06V 40/28 |
| 2022/0043517 | A1 | 2/2022 | Lu et al. | |

FOREIGN PATENT DOCUMENTS

| | | | | |
|---|---|---|---|---|
| CN | 112114665 A | | 12/2020 | |
| CN | 112286440 A | * | 1/2021 | G06F 3/0488 |
| CN | 112492090 A | | 3/2021 | |
| CN | 113205074 A | | 8/2021 | |
| CN | 113849068 A | | 12/2021 | |
| KR | 20200005243 A | | 1/2020 | |

OTHER PUBLICATIONS

Hinckley, Ken, et al. "Pen+touch=new tools." Proceedings of the 23nd annual ACM symposium on User interface software and technology. 2010.

Cami, Drini, et al. "Unimanual pen+touch input using variations of precision grip postures." Proceedings of the 31st Annual ACM Symposium on User Interface Software and Technology. 2018.

Song, Hyunyoung, et al. "Grips and gestures on a multi-touch pen." Proceedings of the SIGCHI conference on Human Factors in computing systems. 2011.

Matulic, Fabrice, et al. "Eliciting Pen-Holding Postures for General Input with Suitability for EMG Armband Detection." Proceedings of the 2019 ACM International Conference on Interactive Surfaces and Spaces. 2019.

Matulic, Fabrice, et al. "Pensight: Enhanced interaction with a pen-top camera." Proceedings of the 2020 CHI Conference on Human Factors in Computing Systems. 2020.

Bi, Hongliang, Jian Zhang, and Yanjiao Chen. "SmartGe: identifying pen-holding gesture with smartwatch." IEEE Access 8 (2020): 28820-28830.

Zhang, Jian, et al. "SmartWriting: Pen-holding gesture recognition with smartwatch." ICC 2019-2019 IEEE International Conference on Communications (ICC). IEEE, 2019.

Zhang, Jian, et al. "SmartSO: Chinese Character and Stroke Order Recognition with Smartwatch." IEEE Transactions on Mobile Computing 20.7 (2020): 2490-2504.

Le, Huy Viet, Sven Mayer, and Niels Henze. "InfiniTouch: Finger-aware interaction on fully touch sensitive smartphones." Proceedings of the 31st Annual ACM Symposium on User Interface Software and Technology. 2018.

Hinckley, Ken, et al. "Pre-Touch Sensing for Mobile Interaction" Touch Interaction #chi4good, CHI 2016, San JOse, CA, USA.

* cited by examiner

METHODS AND SYSTEMS FOR MULTIMODAL HAND STATE PREDICTION

FIELD

The present disclosure is related to methods and systems for 3D hand state prediction, in particular, for classifying and modeling 3D hand motion or 3D hand posture using inputs from multiple modalities.

BACKGROUND

Digital pens have emerged as a popular tool for interacting with digital devices such as tablets, smartphones or laptops with touchscreens. As digital pens can mimic interaction with traditional pen and paper, digital pens are often employed for tasks such as writing and drawing, or for digital interactions that require higher levels of intricacy such as navigation or playing games, among others. Early versions of stylus tools for use with personal digital assistant (PDA) devices were limited to point and click operations, however recent generations of digital pens are often equipped with sensors that can provide additional inputs for improving human-computer interaction.

In many software applications, user-interfaces require the ability to switch between modes of operation or to instruct commands that adjust mode attributes. Traditional approaches to such interactions relied on menus, widgets or shortcut keys, however these can be cumbersome to manipulate on small screens. Therefore, a need exists to improve the ease and efficiency of digital pen interaction with digital devices Accordingly, it would be useful to provide a method and system for improving user experience when interacting digital devices using a digital pen.

SUMMARY

In various examples, the present disclosure describes a hand state prediction system which processes input motion sensor and contact surface signals and generates hand state predictions. The hand state prediction system includes a machine learning-based model, such as a neural network model that is trained to convert inertial motion measurements and surface contact data into predictions of a corresponding hand state in response to a hand action, for example, a hand gesture or gripping posture. For each window of data sampled, motion data and contact data are obtained, processed and fused to generate a fused output. The hand state prediction system can operate in continuous mode to automatically detect a start and an end of a hand action, or a user can designate a start and an end of a hand action. A multimodal hand state is generated by a multimodal classifier by processing the fused output. Instructions represented by a hand action (e.g. a gesture or a posture) can be acted upon through a command action performed by a computing device or a computer application.

In some examples, representations of the state of a user's hand in 3D space captured by IMU data and surface contact data are fused into a fused output that may be learned by a neural network of the hand state prediction system.

The hand state prediction system combines information from multiple modalities (e.g. inertial motion data generated by a device held in a user's hand and surface contact data generated by the user's hand), for example, by fusing a prediction of a hand action based on data from a motion sensing device (i.e. 3D motion captured by a motion sensing device in response to the user's hand action) and a prediction of a hand action based on contact data (i.e. contact area and optionally force measurements generated in response to the user's hand action, while the user's hand is resting on a contact surface) into a fused output, which results in a better prediction of a user's hand state. Combining information from multiple modalities into a fused output may enable additional information to be extracted from the contact surface data to help to capture important aspects of hand action, such as balance and motor control that may not be present in 3D motion data captured from a motion sensing device alone.

A neural network included in the hand state prediction system is optimized to learn better representations from each modality (e.g. hand motion and hand contact area or contact force), contributing to improved overall performance of the hand state prediction system. For example, a motion classifier of the neural network configured to process translational and rotational motion from IMU data is optimized to classify hand motion using IMU data while a contact classifier of the neural network configured to process surface contact data is optimized to classify hand motion using surface contact data. Improved performance of the hand state prediction system may therefore be demonstrated by more accurately predicting a hand gesture or gripping position.

Hand motion data can be acquired from low cost and low power devices to simplify implementation. A low cost, low power and low profile IMU motion sensor (e.g. 3-degree of freedom (3-DoF) IMU, a 6-degree of freedom (6-DoF) IMU, or a 9-degree of freedom (9-DoF) IMU) may be coupled to a device used to capture hand motion, for example, coupled to a digital pen body or coupled to another device. Similarly, for applications requiring lower power consumption, a capacitive touch screen can be used as the contact sensor instead of a 3D pressure pad. Flexible hardware and software configuration enable discrete or continuous sampling.

In some aspects, the present disclosure describes a method for generating a multimodal hand state prediction. The method includes: obtaining motion data from a motion sensing device that is configured to sense motion of a user's hand; obtaining contact data from a contact surface that is configured to sense contact of the user's hand; and generating a multimodal hand state based on a fusing of the motion data and the contact data.

In some aspects of the method, generating the multimodal hand state comprises: pre-processing the motion data to generate pre-processed motion data; and classifying the pre-processed motion data using a trained motion classifier to generate a first output, the first output including a probability corresponding to one or more classes.

In some aspects of the method, generating the multimodal hand state further comprises: pre-processing the contact data to generate pre-processed contact data; and classifying the pre-processed contact data using a trained contact classifier to generate a second output, the second output including a probability corresponding to one or more classes.

In some aspects of the method, generating the multimodal hand state further comprises: concatenating the first output and the second output to generate a fused output.

In some aspects of the method, generating the multimodal hand state further comprises: classifying the fused output using a trained multimodal classifier to generate the multimodal hand state, the multimodal hand state including a probability corresponding to one or more classes.

In some aspects of the method, prior to obtaining the motion data and contact data: receiving an instruction to begin sampling the motion data, and when the instruction to begin sampling the motion data is received, sampling the motion data; receiving an instruction to begin sampling the contact data, and when the instruction to begin sampling the contact data is received, sampling the contact data; receiving an instruction to end sampling the motion data; receiving an instruction to end sampling the contact data; storing the sampled motion data as the motion data; and storing the sampled contact data as the contact data.

In some aspects of the method, prior to obtaining the motion data and contact data: continuously sampling the motion data and the contact data; determining, based on a threshold corresponding to the continuously sampled motion data and a threshold corresponding to the continuously sampled contact data, when a start of a hand action occurs; determining when an end of the hand action occurs based on the start of the hand action occurring; extracting the sampled motion data from the continuously sampled motion data based on the start of the hand action and the end of the hand action; extracting the sampled contact data from the continuously sampled contact data based on the start of the hand action and the end of the hand action; storing the sampled motion data as the motion data; and storing the sampled contact data as the contact data.

In some aspects of the method, further comprising: transforming the multimodal hand state into a command action based on a predefined set of commands.

In some aspects of the method, wherein the motion sensing device includes an inertial measurement unit (IMU).

In some aspects of the method, wherein the contact surface is a capacitive touch pad, the capacitive touch pad capturing the contact data in 2D.

In some aspects of the method, wherein the contact surface is a pressure sensor pad, the pressure sensor pad capturing the contact data in 3D.

In some aspects of the method, further comprising: obtaining peripheral contact data from a peripheral contact surface operatively coupled to the motion sensing device, that is configured to sense peripheral contact of the user's hand on the motion sensing device; and generating the multimodal hand motion state based on a fusing of the motion data, the contact data and the peripheral contact data.

In some aspects of the method, wherein the multimodal hand state is a classification prediction corresponding to one or more classes of hand actions.

In some aspects of the method, wherein the multimodal hand motion state is a real-time 3D skeletal representation of a user's hand in a 3D space.

In some aspects, the present disclosure describes a system. The system comprises: a motion sensing device that is configured to sense motion of a user's hand and output corresponding motion data; a contact surface that is configured to sense contact of the user's hand and output corresponding contact data; one or more memories storing executable instructions; and one or more processors coupled to the motion sensing device, contact surface and one or more memories, the executable instructions configuring the one or more processors to: generate a multi-modal hand state based on a fusing of the motion data and the contact data.

In some aspects, the present disclosure describes a non-transitory computer-readable medium having machine-executable instructions stored thereon which, when executed by a processor of a computing system, cause the computing system to perform any of the preceding example aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

As used herein, statements that a second item (e.g., a signal, value, scalar, vector, matrix, calculation, or bit sequence) is "based on" a first item can mean that characteristics of the second item are affected or determined at least in part by characteristics of the first item. The first item can be considered an input to an operation or calculation, or a series of operations or calculations that produces the second item as an output that is not independent from the first item.

The following describes example technical solutions of this disclosure with reference to accompanying figures. Similar reference numerals may have been used in different figures to denote similar components.

In various examples, the present disclosure describes a hand state prediction system which processes input motion sensor and contact surface signals and generates hand state predictions. The hand state prediction system includes a machine learning-based model, such as a neural network model that is trained to convert inertial motion measurements and surface contact data into predictions of a corresponding hand state in response to a hand action, for example, a hand gesture or gripping posture. For each window of data sampled, motion data and contact data are obtained, processed and fused to generate a fused output. The hand state prediction system can operate in continuous mode to automatically detect a start and an end of a hand action, or a user can designate a start and an end of a hand action. A multimodal hand state is generated by a multimodal classifier by processing the fused output. Instructions represented by a hand action (e.g. a gesture or a posture) can be acted upon through a command action performed by a computing device or a computer application.

To assist in understanding the present disclosure, the following describes some concepts relevant to hand motion classification, along with some relevant terminology that may be related to examples disclosed herein.

Machine learning (ML) is an application of artificial intelligence (AI) that provides systems the ability to automatically learn and improve from experience without being explicitly programmed. A neural network consists of neurons. A neuron is a computational unit that uses $x_s$ and an intercept of 1 as inputs. An output from the computational unit may be:

$$h_{W,b}(x) = f(W^T x) = f\left(\sum_{s=1}^{n} W_s x_s + b\right)$$

where s=1, 2, . . . n, n is a natural number greater than 1, $W_s$ is a weight of $x_s$, b is an offset (i.e. bias) of the neuron and f is an activation function of the neuron and used to introduce a nonlinear feature to the neural network, to convert an input of the neuron to an output denoted as h.

A neural network may be constructed in layers, including an input layer that accepts inputs, an output layer that generates a prediction as output, and in the case of deep neural networks (DNN), a plurality of hidden layers which are situated between the input layer and output layer. The output of the activation function in one layer may be used as an input to a neuron of a subsequent layer in the neural network. In other words, an output from one neuron may be an input to another neuron. Different activation functions may be used for different purposes in a neural network, with hidden layers commonly using different activation functions than output layers.

A layer is considered to be a fully connected layer when there is a full connection between two adjacent layers of the neural network. To be specific, for two adjacent layers (e.g., the i-th layer and the (i+1)-th layer) to be fully connected, each and every neuron in the i-th layer must be connected to each and every neuron in the (i+1)-th layer.

Processing at each layer of the DNN may follow a linear relational expression: $\vec{y} = \alpha(W\vec{x} + \vec{b})$, where $\vec{x}$ is an input vector, $\vec{y}$ is an output vector, $\vec{b}$ is an offset vector, W is a weight (also referred to as a coefficient), and $\alpha(\cdot)$ is an activation function. At each layer, the operation is performed on an input vector $\vec{x}$, to obtain an output vector $\vec{y}$. Because there is a large quantity of layers in the DNN, there is also a large quantity of weights W and offset vectors $\vec{b}$. The weights may be referred to as parameters of the neural network, the optimal values of which may be learned by training the neural network.

In a DNN, a greater number of hidden layers may enable the DNN to better model a complex situation (e.g., a real-world situation). In theory, a DNN with more parameters is more complex, has a larger capacity (which may refer to the ability of a learned model to fit a variety of possible scenarios), and indicates that the DNN can complete a more complex learning task. Training of the DNN is a process of learning the weight matrix. A purpose of the training is to obtain a trained weight matrix, which consists of the learned weights W of all layers of the DNN. Before a DNN can be trained, the initial weights need to be set. For example, an initialization function such as random or Gaussian distributions may define initial weights.

In the process of training a DNN, two approaches are commonly used: supervised learning and unsupervised learning. In unsupervised learning, the neural network is not provided with any information on desired outputs, and the neural network is trained to arrive at a set of learned weights on its own. In supervised learning, a predicted value outputted by the DNN may be compared to a desired target value (e.g., a ground truth value). A weight vector (which is a vector containing the weights W for a given layer) of each layer of the DNN is updated based on a difference between the predicted value and the desired target value. For example, if the predicted value outputted by the DNN is excessively high, the weight vector for each layer may be adjusted to lower the predicted value. This comparison and adjustment may be carried out iteratively until a convergence condition is met (e.g., a predefined maximum number of iterations has been performed, or the weight vector converges). A loss function or an objective function is defined, as a way to quantitatively represent how close the predicted value is to the target value. An objective function represents a quantity to be optimized (e.g., minimized or maximized) in order to bring the predicted value as close to the target value as possible. A loss function more specifically represents the difference between the predicted value and the target value, and the goal of training the DNN is to minimize the loss function.

Backpropagation is an algorithm for training a DNN. Backpropagation is used to adjust (also referred to as update) a value of a parameter (e.g., a weight) in the DNN, so that the error (or loss) in the output becomes smaller. For example, a defined loss function is calculated, from forward propagation of an input to an output of the DNN. Backpropagation calculates a gradient of the loss function with respect to the parameters of the DNN, and a gradient algorithm (e.g., gradient descent) is used to update the parameters to reduce the loss function. Backpropagation is performed iteratively, so that the loss function is converged or minimized.

A convolutional neural network (CNN) is a neural network that is designed to find the spatial relationship in data. CNNs are commonly used in applications related to computer vision or image processing for purposes of classification, regression, segmentation and/or object detection. A CNN is a DNN with a convolutional structure. The CNN includes a feature extractor consisting of a convolutional layer and a sub-sampling layer. The convolutional layer consists of kernels or filters that are convolved with a two-dimensional (2D) input image to generate feature maps or feature representations using a trainable filter.

A recurrent neural network (RNN) is a neural network that is designed to process sequential data and make predictions based on the processed sequential data. RNNs have an internal memory that remembers inputs (e.g. the sequential data), thereby allowing previous outputs (e.g. predictions) to be fed back into the RNN and information to be passed from one time step to the next time step. RNNs are commonly used in applications with temporal components, for example real-time applications or interactions.

In the present disclosure, a "hand action" can mean an action intentionally performed by a user's hand, for example, while engaging a motion sensing device and a contact surface. In some examples, a hand action may be a gesture or a hand movement. In other examples, a hand action may be a hand posture.

In the present disclosure, a "hand state" can mean the state of a user's hand in 3D space in response to, or while performing, a hand action. In some examples, the hand state may include positional information about the position of the user's hand in 3D space. In some examples, a user's hand state can be described while the user's hand is in motion, for example, while performing a gesture (e.g. a swipe action or a mid-air gesture) or a hand movement, such as writing or drawing. In other examples, a user's hand state can be described while the user's hand is still or motionless, for example, while engaged in a specific hand posture. In some examples, a user's hand state can be described with reference to a 3D skeletal model of the user's hand.

In the present disclosure, the term "modality" refers to a particular mode in which something exists or is experienced or expressed. For example, a modality can mean a mode of data collection (e.g. inertial motion or contact force). In another example, a modality can mean a way of operating an application (e.g. drawing mode or erasing mode).

In the present disclosure, a "multimodal input" can mean an input that encompasses two or more input modalities, for example, a combination of two or more modes of input data. In this regard, a multimodal input may be a single input that comprises a combination of individual inputs that were obtained from two or more different data sources, for example, an inertial motion sensor, a force sensor, a contact sensor etc.

In the present disclosure, "fusion" can mean the consolidation of multiple elements into a single representation. For example, a merging of information from different sensors (e.g. motion sensors, capacitive touchscreens or force sensors) can be an example of "sensor fusion." Fusing information from different sources may help to enhance correlated features and reduce uncertainty in a system, leading to improved recognition accuracy.

In the present disclosure, "position" can mean a physical configuration of the human body or a part of the human body. For example, a hand position or a wrist position may describe the configuration of a user's hand or wrist in 3D space.

In the present disclosure, "posture" can mean an intentional or habitually assumed position for a specific purpose. For example, a "gripping posture" may describe the configuration of a user's fingers around the shaft of a pen while holding a digital pen for the purpose of executing a task (e.g. writing or drawing) with the pen, or to execute a gesture with the pen. Gripping postures may be described in a number of ways, for example, common gripping postures include a correct grip, a close grip, a fold grip, a tuck grip, a squeeze grip, a hook grip, a wrap grip, a mount grip or a tripod grip.

In the present disclosure, "gesture" can mean a particular movement of a part of the human body, or sequence of movements that may be used for non-verbal communication, for example, a controlled movement that contains meaning to a person who observes the movement, or to a device that receives an input representing the movement. In some examples, gestures may be performed by a part of the body, for example, a finger executing a "swipe" gesture in contact with a touchscreen or in mid-air, or a gesture may be performed by a device being operated by a user, for example, a right-to-left movement executed by a user while holding a device (e.g. digital pen), among others.

In the present disclosure, "mode-switching" can mean an act of switching from one mode of operation to another mode of operation. For example, switching between performing a writing operation and an erasing operation.

In the present disclosure, "command action" is an action performed by a computing device or computer application in response to an instruction by a user. For example, a command action associated with a "circle" gesture made by a user within a drawing application may be interpreted by the device as a "mode-switching" command and may have the effect of changing the user's mode of operation from "drawing" to "selecting an object" within the drawing canvas.

To assist in understanding the present disclosure, some existing technologies are first discussed.

Some examples of existing technologies applied to digital pens include the incorporation of pressure sensors at the tip of the tool for measuring an input force applied by the digital pen on the surface of a device, to assist with writing and drawing. In other examples, digital pens are equipped with external buttons that when pressed, enable users to perform various functions, such as mode-switching (e.g. switching between performing a writing operation and an erasing operation).

Some existing technologies have drawbacks in that the physical buttons may introduce additional complexity in operation and hardware cost, and may not be aesthetically pleasing. In addition, due to the small screen size associated with many personal electronic devices, user interfaces are limited in size and available space, and shortcut keys and menu buttons for tasks such as mode-switching typically employed on larger devices cannot be accommodated.

The present disclosure describes examples that may help to address some or all of the above drawbacks of existing technologies.

Figure 1:
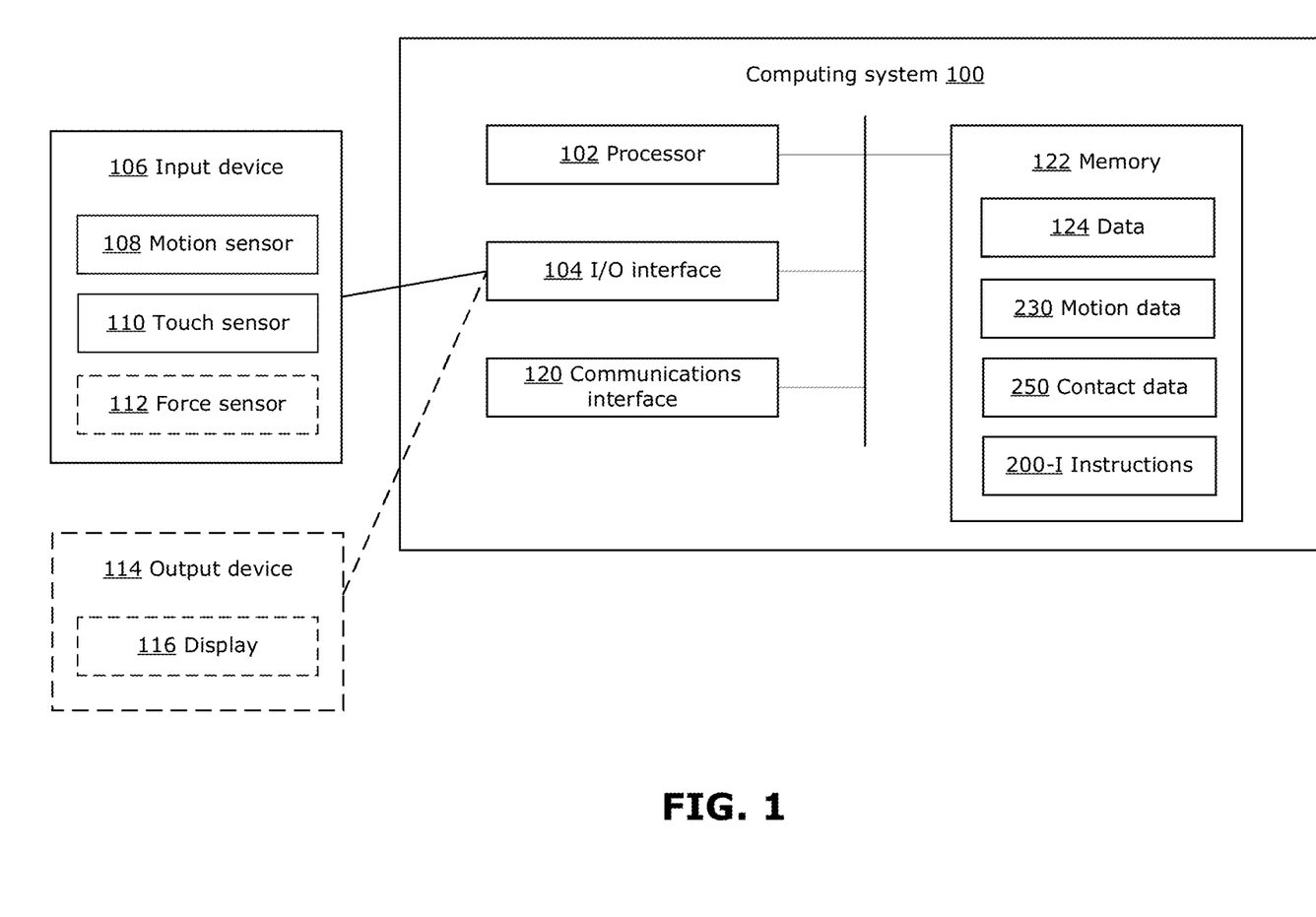
FIG. 1 is a block diagram of a computing system that may be used for implementing a hand state prediction system, in accordance with example embodiments of the present disclosure.

FIG. 1 shows a block diagram of an example hardware structure of a computing system 100 that is suitable for implementing embodiments of the system and methods of the present disclosure, described herein. Examples of embodiments of system and methods of the present disclosure may be implemented in other computing systems, which may include components different from those discussed below. The computing system 100 may be used to execute instructions to carry out examples of the methods described in the present disclosure. The computing system 100 may also be used to train the machine learning models of the hand motion prediction system 200, or the hand motion prediction system 200 may be trained by another computing system.

Although FIG. 1 shows a single instance of each component, there may be multiple instances of each component in the computing system 100.

The computing system 100 includes at least one processor 102, such as a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 may include an input/output (I/O) interface 104, which may enable interfacing with an input device 106 and/or an optional output device 114. In the example shown, the input device 106 (e.g., a keyboard, a mouse, a camera, a touchscreen, a stylus and/or a keypad) may also include a motion sensor 108, a touch sensor 110, and an optional force sensor 112. In the example shown, the optional output device 114 (e.g., a display, a speaker and/or a printer) is shown as optional and external to the computing system 100. In other example embodiments, there may not be any input device 106 and output device 114, in which case the I/O interface 104 may not be needed.

The I/O interface 104 may buffer the data generated by the input units 120 and provide the data to the processor 102 to be processed in real-time or near real-time (e.g., within 10 ms, or within 100 ms). The I/O interface 104 may perform preprocessing operations on the input data, for example normalization, filtering, denoising, etc., prior to providing the data to the processor 102.

The I/O interface 104 may also translate control signals from the processor 102 into output signals suitable to each respective output device 114. A display 116 may receive signals to provide a visual output to a user. In some examples, the display 116 may be a touch-sensitive display (also referred to as a touchscreen) in which the touch sensor 110 is integrated. A touch-sensitive display may both provide visual output and receive touch input.

The computing system 100 may include an optional communications interface 120 for wired or wireless communication with other computing systems (e.g., other computing systems in a network) or devices. The communications interface 120 may include wired links (e.g., Ethernet cable) and/or wireless links (e.g., one or more antennas) for intra-network and/or inter-network communications.

The computing system 100 may include one or more memories 122 (collectively referred to as "memory 122"), which may include a volatile or non-volatile memory (e.g., a flash memory, a random access memory (RAM), and/or a read-only memory (ROM)). The non-transitory memory 122 may store instructions for execution by the processor 102, such as to carry out example embodiments of methods described in the present disclosure. For example, the memory 122 may store instructions for implementing any of the systems and methods disclosed herein. The memory 122 may include other software instructions, such as for implementing an operating system (OS) and other applications/functions.

The memory 122 may also store other data 124, information, rules, policies, and machine-executable instructions described herein, including a motion data 230 captured by the motion sensor 108, contact data 250 captured by the touch sensor 110 or the force sensor 112 or data representative of a user's hand motion captured by an input device on another computing system and communicated to the computing system 100.

In some examples, the computing system 100 may also include one or more electronic storage units (not shown), such as a solid state drive, a hard disk drive, a magnetic disk drive and/or an optical disk drive. In some examples, data and/or instructions may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 116 to implement data storage, retrieval, and caching functions of the computing system 100. The components of the computing system 100 may communicate with each other via a bus, for example.

Although the computing system 100 is illustrated as a single block, the computing system 100 may be a single physical machine or device (e.g., implemented as a single computing device, such as a single workstation, single end user device, single server, etc.). The computing system may be a mobile communications device (e.g. a smartphone), a laptop computer, a tablet, a desktop computer, a wearable device, a vehicle driver assistance system, an assistive technology device, among others. In some embodiments, the computing system 100 may comprise a plurality of physical machines or devices (e.g., implemented as a cluster of machines, server, or devices). In some embodiments, the computing system 100 may be a virtualized computing system (e.g., a virtual machine, a virtual server) emulated on a cluster of physical machines or by a cloud computing system.

Figure 2A:
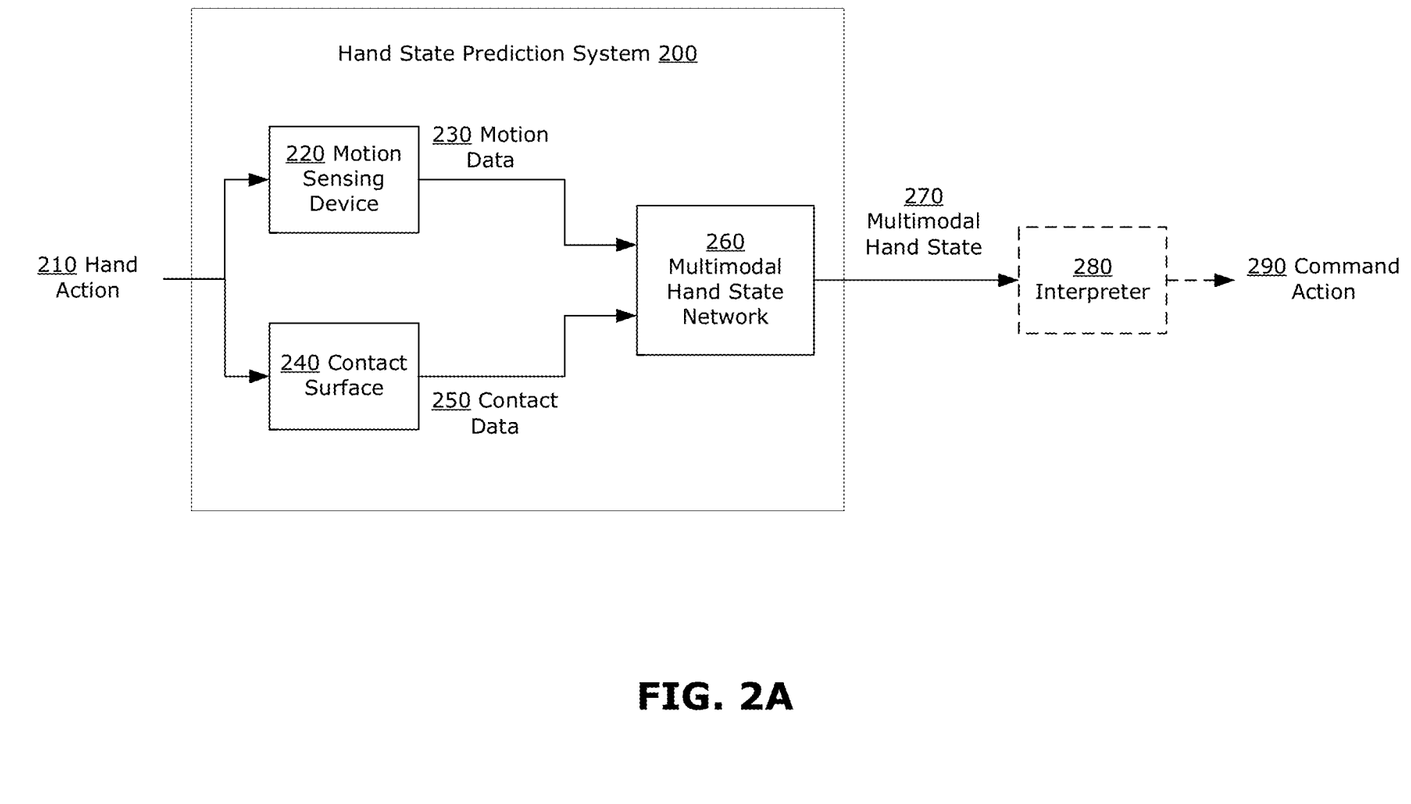
FIG. 2A is a block diagram illustrating a hand state prediction system, in accordance with examples of the present disclosure.

FIG. 2A shows a block diagram of an example hand state prediction system 200 of the present disclosure. The hand state prediction system 200 may be a software that is implemented in the computing system 100 of FIG. 1, in which the processor 102 is configured to execute instructions 200-I of the hand state prediction system 200 stored in the memory 122. The hand state prediction system 200 includes a motion sensing device 220, a contact surface 240 and a multimodal hand state network 260.

The hand state prediction system 200 receives an input of a hand action 210 and outputs a multimodal hand state 270 that may be transformed into a command action 290. In some embodiments, for example, the hand action 210 may be representative of a gesture or a gesture sequence. For example, gestures may include a left-to-right gesture, a right-to-left gesture, an up-to-down gesture, a down-to-up gesture and a circle or curved "rotation" gesture, among others. In other embodiments, for example, the hand action 210 may be representative of a gripping posture. For example, gripping postures may include postures for holding a pen in a user's hand, for example postures with a correct grip, a close grip, a fold grip, a tuck grip, a squeeze grip, a hook grip, a wrap grip, a mount grip or a tripod grip, among others. Example gripping postures are described in: Bi, Hongliang, Jian Zhang, and Yanjiao Chen, "SmartGe: identifying pen-holding gesture with smartwatch," IEEE Access 8 (2020): 28820-28830, the entirety of which is hereby incorporated by reference. In some examples, the hand action 210 may be captured by a motion sensing device 220 that is configured to sense motion of a user's hand 202, for example, a digital pen or a stylus equipped with a motion sensor 108, to generate motion data 230. In some examples, the motion data 230 may be sampled over a predetermined period of time or the motion data 230 may be continuously sampled. In some examples, the hand action 210 may also be captured by a contact surface 240, for example, a 2D touch sensitive surface or a 3D pressure sensor pad, to generate contact data 250. In some examples, the contact data 250 may be sampled over a predetermined period of time or the contact data 250 may be continuously sampled.

In some examples the hand state prediction system 200 may generate a multimodal hand state 270. In some examples, the multimodal hand state 270 may be a classification prediction corresponding to one or more classes of hand actions, for example, a gesture or a gripping posture classified from a set of gesture classes or a set of gripping posture classes. In some examples, a multimodal hand state 270 may be generated based on decision criteria for classification, for example, using one hot encoding or comparing a maximum confidence probability to a pre-determined threshold. In some examples, the multimodal hand state 270 may indicate whether a gripping posture is correct or incorrect, based on a set of gripping posture classes or based on a 3D skeletal model of a user's hand posture. In other examples, the multimodal hand state 270 may be a real-time 3D skeletal representation of a user's hand in 3D space, for example, a 3D skeleton model may map, in real-time, coordinates corresponding to one or more modeled skeletal features to a shape, position or posture of a user's hand. Optionally, the multimodal hand state 270 may be transformed by an interpreter 280 into a command action 290 based on a predefined set of commands. A computing system or computer application running on a computing system that is capable of executing the predefined command action 290 may then be able to execute the command action 290. In an example embodiment, a user may perform a hand action 210 such as a right-to-left motion gesture while interacting with an application on the computing system 100 such as an e-reader, which may then be received as motion data 230 and contact data 250 by the computing system 100 implementing the hand state prediction system 200. The hand state prediction system 200 may process the motion data 230 and the contact data 250 to output a multimodal hand state 270 that captures the user's intent to "turn the page". The computing system 100 may then be able to map the multimodal hand state 270 to a command action 290 from a predefined set of command actions that the user wishes to turn the page, and may execute the command action 290. In another example embodiment, a user may perform a hand action 210 such as a circle motion gesture while interacting with a drawing application on the computing system 100, which may then be received as motion data 230 and contact data 250 by the computing system 100 implementing the hand state prediction system 200. The hand state prediction system 200 may process the motion data 230 and the contact data 250 to output a multimodal hand state 270 that captures the user's intent to switch modes from drawing mode to select mode, and "select an object" in the drawing canvas. The computing system 100 may then be able to map the multimodal hand state 270 to a command action 290 from a predefined set of command actions that the user wishes to switch modes of operation in the drawing application and select the object, and may execute the command action 290.

Figure 2B:
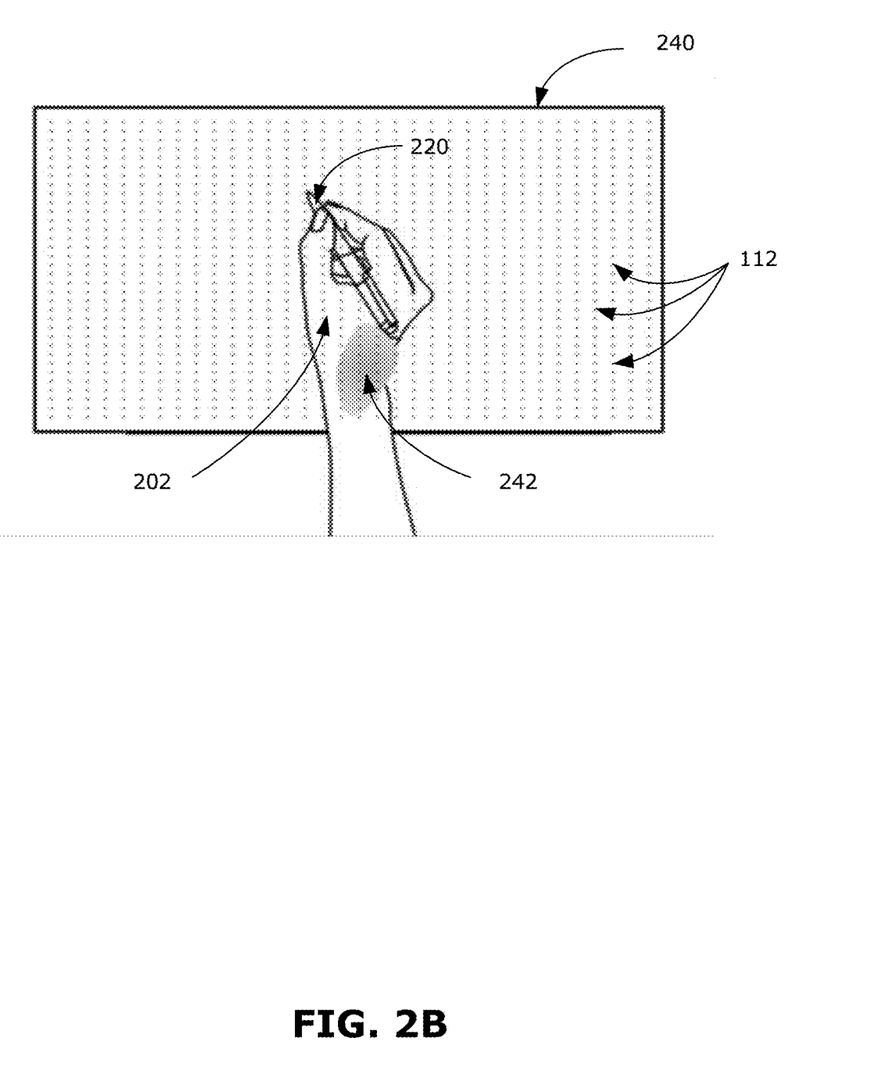
FIG. 2B illustrates an example embodiment of the hand state prediction system of FIG. 2A, with inputs obtained from a motion sensing device and a contact surface, in accordance with examples of the present disclosure.

FIG. 2B illustrates an example embodiment of the hand state prediction system 200, where inputs are obtained from a motion sensing device 220 and a contact surface 240 that are configured to sense motion of a user's hand 202, in accordance with examples of the present disclosure. In some embodiments, for example, the motion sensing device 220 may be an object operatively coupled to the user, for example, the motion sensing device 220 may be held in a user's hand, or the motion sensing device 220 may be coupled to an arm or wrist of a user, among others. In some embodiments, for example, the motion sensing device 220 may be a digital pen, for example, having a rigid body, the rigid body being an elongated shaft with a first end and a second end. In some examples, the motion sensing device 220 that is configured to sense motion of a user's hand 202 wherein the first end of the elongated shaft is proximal to the user's fingers and the second end of the elongated shaft is distal to the user's fingers and wherein in response to a hand action 210, the second end may experience a greater degree of translational and rotational motion than the first end. In other embodiments, for example, the motion sensing device 220 may be another object, for example, a wearable device. In some examples, the user's hand 202 is also coupled to the contact surface 240, for example, with a portion of the user's palm or wrist resting on the contact surface 240 to generate a contact area 242. In some examples, the contact area 242 may represent a pivot point for a user's palm or wrist while the user performs the hand action 210. In other examples, the contact area 242 may represent a drag motion of the palm of a user's hand 202 while the user performs the hand action 210. In some examples, more than one contact area 242 may be generated, for example, if more than one portion of a user's hand 202 (e.g. a finger) interacts with the contact surface 240 during the hand action 210.

In some examples, the motion sensing device 220 includes a motion sensor 108, for example an inertial measurement unit (IMU) to detect the movement of the motion sensing device 220 in response to a user's hand motion 210. In some examples, the motion sensor 108 may be a 3 degree-of-freedom (3DoF) IMU, a 6 degree-of-freedom (6DoF) IMU or a 9 degree-of-freedom (9DoF) IMU, where the IMU may comprise an accelerometer that measures translational acceleration in 3-axes, a gyroscope that measures rotational velocity or acceleration in another 3-axes or optionally a magnetometer that measures a magnetic field strength in 3-axes. In some examples, the motion data 230 generated by the motion sensing device 220 during a hand action 210 may be represented by 3 channels of time-series translational acceleration measurements (e.g. force or acceleration), 3 channels of time-series rotational velocity measurements (e.g. angular rate) and optionally 3 channels of time-series magnetic field measurements (e.g. orientation), corresponding to movement of the motion sensing device 220 in response to the hand action 210. In some embodiments, for example, the motion device 220 may sample the motion data 230 based on a start and an end of the hand action 210, and in some examples, the sampled motion data may be stored as motion data 230.

In some embodiments, for example, the contact surface 240 may include a touch sensor 110, for example a capacitive touch sensitive surface, to capture 2D positional information corresponding to the contact area 242 of a user's hand 202 on the contact surface 240 in response to the hand action 210. A capacitive touch screen draws small electrical charges to a point of contact by a user, and functions as a capacitor in the region of contact. In some examples, in response to a user's hand placed in contact with the capacitive touch sensitive surface, a change in the capacitance and electrostatic field in the capacitive panel of the touch sensitive surface provides location information corresponding to the contact area 242. In some examples, the contact data 250 generated by the contact surface 240 during a hand action 210 may be represented by a sequence of 2D contours defining the contact area 242. In some embodiments, for example, the contact surface 240 may sample the contact data 250 based on a start and an end of the hand action 210, and in some examples, the sampled contact data may be stored as contact data 250.

In other embodiments, for example, the contact surface 240 may include one or more force sensors 112, where the one or more force sensors 112 may be arranged in a 2D array, for example, as a pressure pad, to measure a force distribution corresponding to the contact area 242 of a user's hand 202 on the contact surface 240 in response to the hand action 210. In some examples, the contact data 250 generated by the contact surface 240 during a hand action 210 may be represented by a sequence of force measurements distributed across the contact surface 240 and defined by the contact area 242. In some examples, the value of the force measurements may be proportional to the magnitude of the applied force by the user's hand 202 at each point in the pressure array of the contact surface 240. In this regard, the contact data 250 generated by one or more force sensors 112 may be considered to be three-dimensional (3D), including both 2D positional information and force measurements defining the contact area 242.

In some examples, a benefit of generating contact data 250 with a capacitive touch sensitive surface is that touch sensitive surfaces require lower power and are readily embedded into many surfaces on commercial devices, for example, tablets, laptops, smartphones or dual-screen devices, compared to a pressure pad that may require greater power requirements. In some examples, a benefit of generating contact data 250 with a pressure pad includes the collection of richer data, including information corresponding to the applied force of a user's hand 202 along with positional information, compared to a 2D touch sensitive surface that captures only 2D positional information.

Returning to FIG. 2A, the motion data 230 and the contact data 250 are input to a multimodal hand state network 260 to generate a multimodal hand state 270. To further describe the multimodal hand state network 260, FIG. 3 may be referenced.

Figure 3:
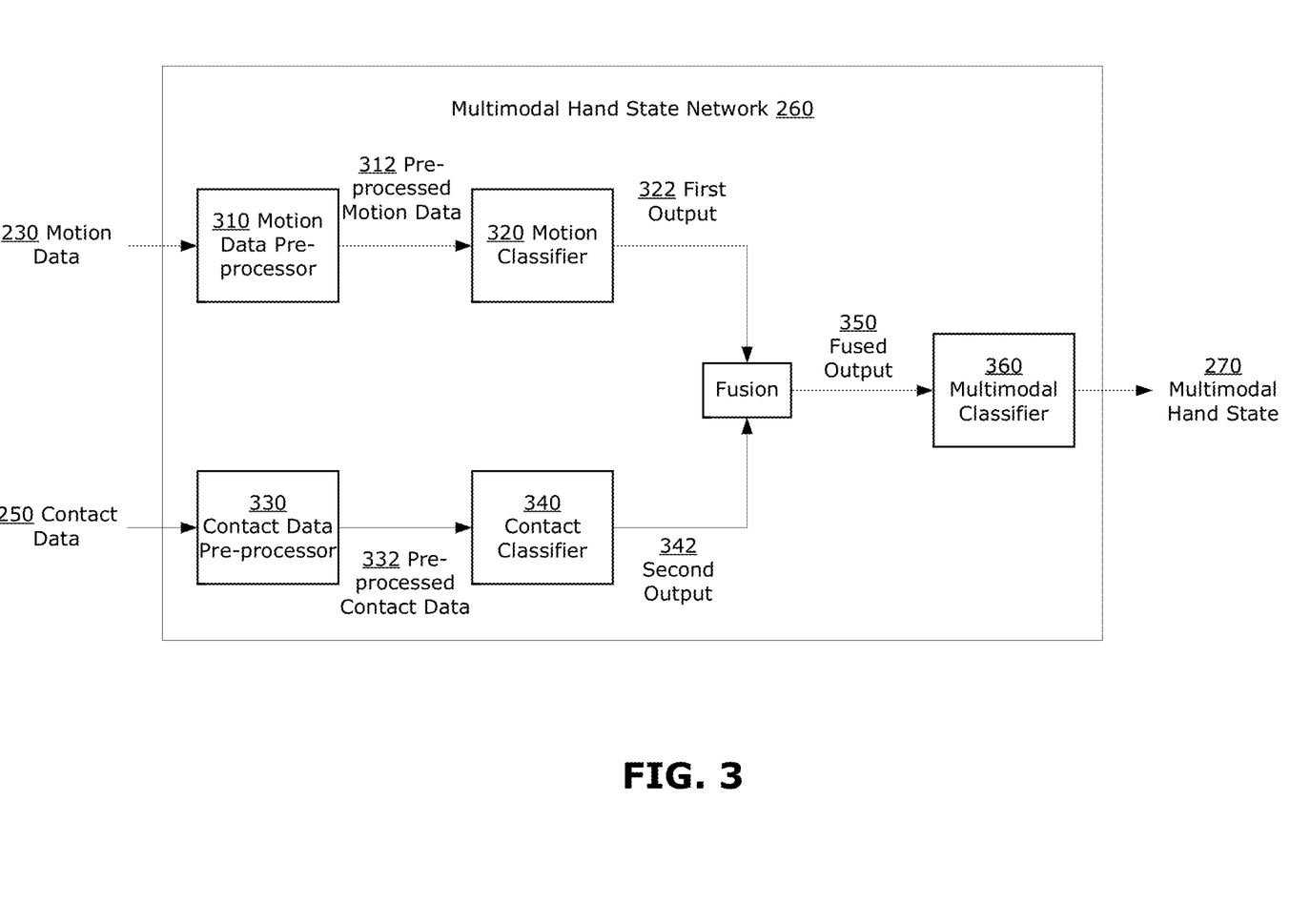
FIG. 3 is a block diagram illustrating a multimodal hand state network of the hand state prediction system of FIG. 2A, in accordance with examples of the present disclosure.

FIG. 3 is a block diagram illustrating a multimodal hand state network 260, in accordance with examples of the present disclosure. In some examples, a motion data pre-processor 310 receives the motion data 230 and generates pre-processed motion data 312. In some examples, the motion data pre-processor 310 may filter the motion data by mean zeroing the columns and forcing a unit variance or applying dynamic time warping (DTW) to time synchronize the data, or other pre-processing operations may be performed, depending on the system input requirements, or depending on the application. In some examples, the motion data 230 may be pre-processed at the motion sensing device 220 or the motion data 230 may be transmitted by the computing system 100 to be pre-processed by the processor 102 of the computing system 100. In some examples, a contact data pre-processor 330 receives the contact data 250 and generates pre-processed contact data 332. In some examples, the contact data pre-processor 330 may convert 2D or 3D contact data 250 into motion history images (MHI). In some examples, other pre-processing operations may be performed, depending on the system input requirements, or depending on the application.

In some examples, the pre-processed motion data 312 is input to a trained motion classifier 320 to generate a first output 322 representing a motion state of the user's hand. In some examples, the motion classifier 320 may be a neural network, for example, a RNN, or a DNN or the motion classifier 320 may be another machine learning model. In some examples, the first output 322 may be a first classification probability (e.g. a prediction confidence) corresponding to each class in a set of one or more classes, where classes may represent various hand gestures or gripping postures. In some examples, the pre-processed contact data 332 is input to a trained contact classifier 340 to generate a second output 342 representing a contact state of the user's hand. In some examples, the contact classifier 340 may be a neural network, for example, a CNN, a RNN or a DNN or the contact classifier 340 may be another machine learning model. In some examples, the second output 342 may be a second classification probability (e.g. a prediction confidence) corresponding to each class in a set of one or more classes, where classes may represent various hand gestures or gripping postures, among others. In some examples, the motion classifier 320 and the contact classifier 340 may be trained, for example, using supervised learning using labeled training datasets including pre-processed motion data and pre-processed contact data obtained from the motion sensing device 220 and the contact surface 240 in response to hand motion executed by various users, using backpropagation to minimize a respective classification loss function, for example a motion classification loss function or a contact classification loss function.

In some examples, the first output 322 and the second output 342 may be fused to generate a fused output 350. In some examples, fusing the first output 322 and the second output 342 may comprise concatenating the first output 322 and the second output 342, or other methods to fuse the first output 322 and the second output 342 may be used. In some examples, the fused output 350 is input to a multimodal classifier 360 to generate a multimodal hand state 270. In some examples, the multimodal hand state 270 may be a multimodal classification probability (e.g. a prediction confidence) corresponding to each class in a set of one or more classes representing various hand actions 210, for example, gestures or gripping postures. In some examples, the multimodal classifier 360 may be a neural network, for example, a DNN or the motion classifier 320 may be another machine learning model. In some examples, the multimodal classifier 360 may be trained, for example, using backpropagation to minimize a multimodal classification loss function.

Returning to FIG. 2, the multimodal hand state 270 output by the multimodal hand state network 260 may optionally be input to an interpreter 280 which is configured to transform the multimodal hand state 270 into a command action 290 based on a predefined set of commands. The predefined set of commands may be stored as data 124 in the memory 122 of the computing system 100. A command action 290 may an action being taken by a computer or computer application, such as an e-reader or a drawing application, in response to hand motion predictions representing a user intent. For example, a command action 290 associated with a "right-to-left" gesture would cause a computer device or computer application such as an e-reader to turn the page, or in another example, perform a mode switching operation.

Figure 4:
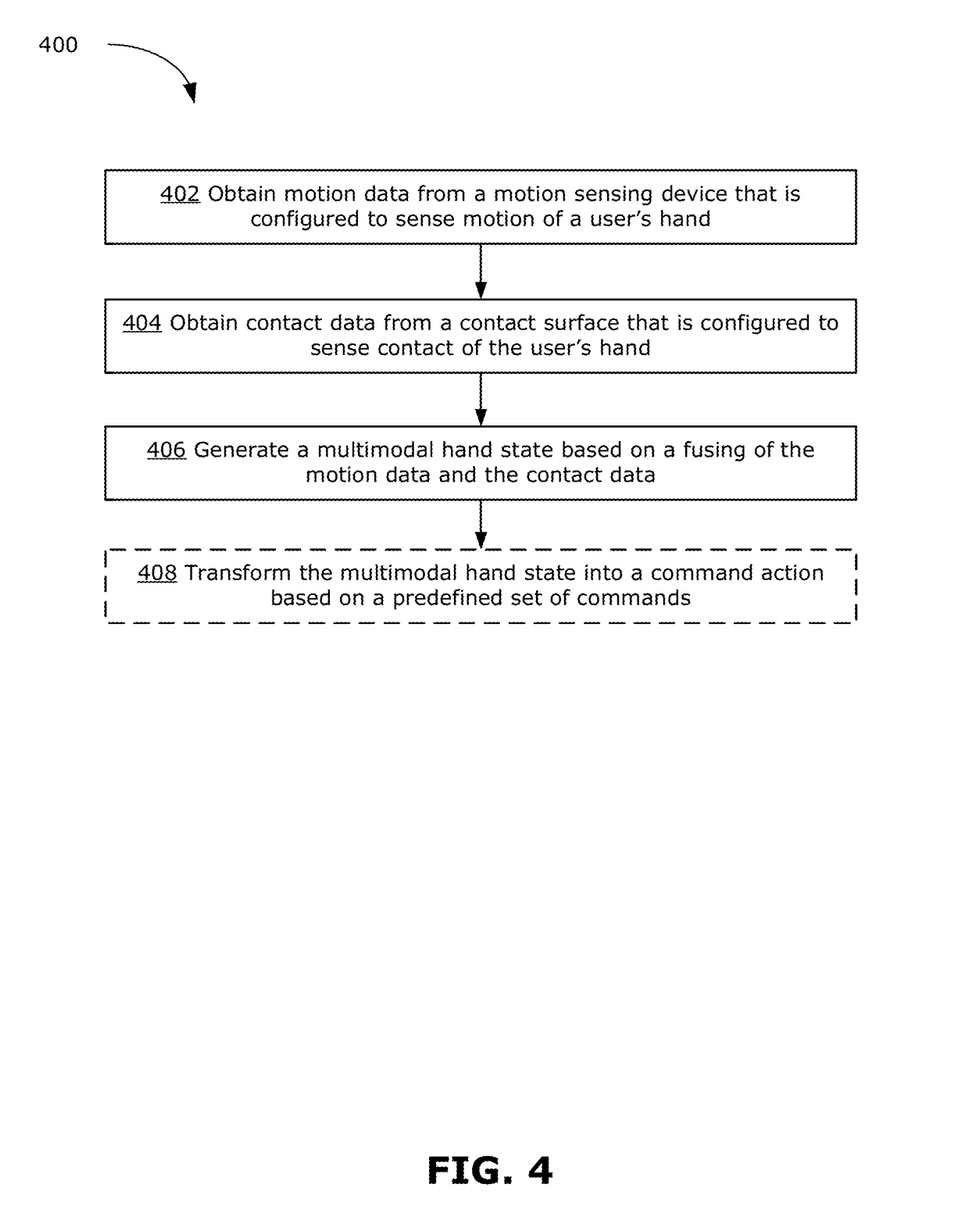
FIG. 4 is a flowchart illustrating an example method for determining a multimodal hand state, in accordance with examples of the present disclosure.

FIG. 4 is a flowchart illustrating an example method 400 for determining a multimodal hand state 270, in accordance with examples of the present disclosure. The method 400 may be performed by the computing system 100. The method 400 represents operations performed by the multimodal hand state network 260 depicted in FIG. 3. For example, the processor 102 may execute computer readable instructions 200-I (which may be stored in the memory 122) to cause the computing system 100 to perform the method 400.

Method 400 begins at step 402 in which motion data 230 is obtained from a motion sensing device 220 configured to sense the motion of a user's hand in response to performing a hand action 210. The motion data 230 may be representative of movement of a user's hand captured by a motion sensor 108 of the computing system 100, and corresponding to a motion sensing device 220.

The method 400 then proceeds to step 404. At step 404, a contact data 250 is obtained from a contact surface 240 configured to sense the contact of a user's hand in response to performing a hand action 210. The contact data 250 may be representative of movement of a user's hand captured by a touch sensor 110 or a force sensor 112 of the computing system 100, and corresponding to a contact surface 240.

The method 400 then proceeds to step 406. At step 406, a multimodal hand state 270 is generated based on a fusing of the motion data 230 and the contact data 250. In some examples, the multimodal hand state 270 may be a multimodal classification probability (e.g. a prediction confidence) corresponding to each class in a set of one or more classes, for example, a gesture or a gripping posture classified from a set of gesture classes or a set of gripping posture classes. In some examples, a multimodal hand state 270 may be generated based on decision criteria for classification, for example, using one hot encoding or comparing a maximum confidence probability to a pre-determined threshold. In some examples, the multimodal hand state 270 may indicate whether a gripping posture is correct or incorrect, based on a set of gripping posture classes or based on a 3D skeletal model of a user's hand posture. In other examples, the multimodal hand state 270 may be a real-time 3D skeletal representation of a user's hand in 3D space, for example, a 3D skeleton model may map, in real-time, coordinates corresponding to one or more modeled skeletal features to a shape, position or posture of a user's hand.

In some examples, prior to fusing the motion data 230 and the contact data 250, the motion data 230 may be processed to generate a first output 322 representing a motion state of a user's hand. In some examples, motion data 230 may be pre-processed, for example, the motion data 230 may be filtered by mean zeroing the columns and forcing a unit variance or by applying dynamic time warping (DTW) to time synchronize the data. In some examples, other pre-processing operations may be performed, depending on the system input requirements, or depending on the application. In some examples, the pre-processed motion data 312 may be classified to generate the first output 322, where the first output 322 may be a first classification probability (e.g. a prediction confidence) corresponding to each class in a set of one or more classes, where classes may represent various hand gestures or gripping postures.

In some examples, prior to fusing the motion data 230 and the contact data 250, the contact data 250 may be processed to generate a second output 342 representing a contact state of a user's hand. In some examples, the contact data 250 may be pre-processed, for example, the 2D or 3D contact data 250 may be converted into motion history images. In some examples, other pre-processing operations may be performed, depending on the system input requirements, or depending on the application. In some examples, the pre-processed contact data 332 may be classified to generate the second output 342, where the second output 342 may be a second classification probability (e.g. a prediction confidence) corresponding to each class in a set of one or more classes, where classes may represent various hand gestures or gripping postures.

In some examples, fusing the motion data 230 and the contact data 250 may comprise fusing the first output 322 and the second output 342 to generate a fused output 350. In some examples, fusing the first output 322 and the second output 342 may comprise concatenating the first output 322 and the second output 342, or other methods to fuse the first output 322 and the second output 342 may be used. Using inputs from both the inertial motion modality and contact force modality, the fused output 350 may be a joint representation of both the inertial motion and contact force modality.

In some examples, step 406 may be described as performing a fusion of multimodal features. Feature fusion may be described as a method to integrate the features of different data to enhance the features distinguished from feature extractors. In the case of multimodal feature fusion, fusion of representations from different modalities (for example, inertial motion and contact force) into a single representation enables the machine learning model to learn a joint representation of each of the modalities. In some examples, a benefit of using a joint representation of the modalities may be that additional information may be extracted from the contact force modality (e.g. contact data 250) to help capture important aspects of a hand action 210 that are not present in the motion data 230 alone.

Optionally, at step 408, the multimodal hand state 270 may be transformed, for example by an interpreter 280 into a command action 290, based on a predefined set of commands. The predefined set of commands may be stored as data 124 in the memory 122 of the computing system 100. A command action 290 may an action being taken by a computer or computer application, such as an e-reader or a drawing application, in response to hand action predictions representing a user intent. For example, a command action 290 associated with a "right-to-left" swipe gesture would cause a computer device or computer application such as an e-reader to turn the page, or in another example, perform a mode switching operation.

Figure 5:
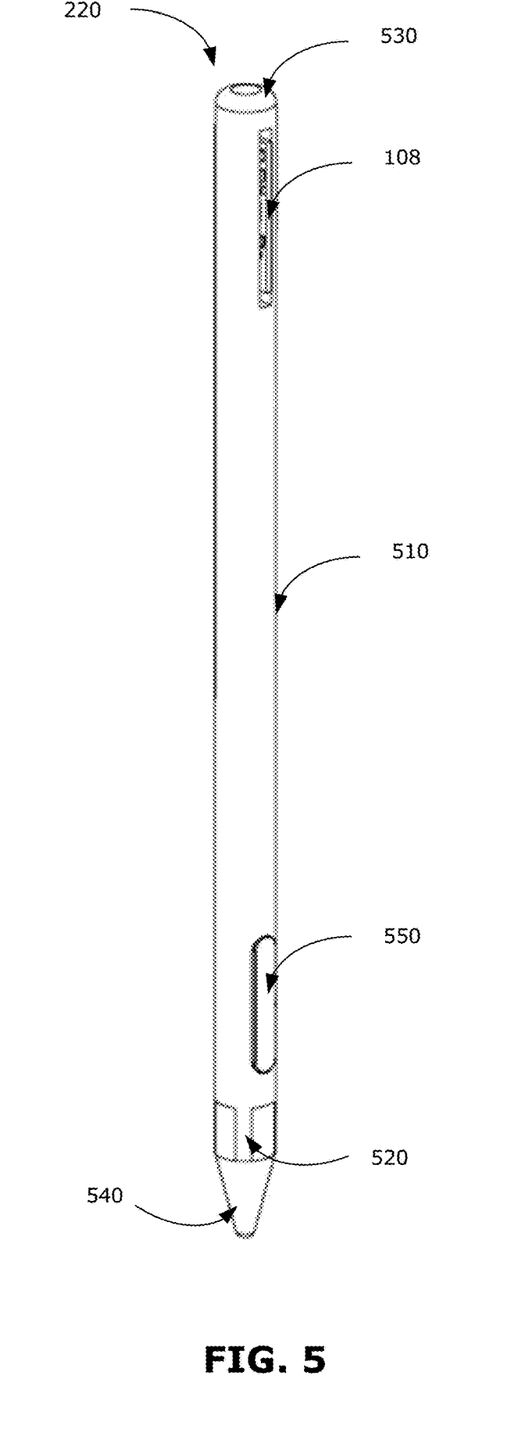
FIG. 5 is a perspective view of an example embodiment of a motion sensing device, configured for delimited sampling, in accordance with examples of the present disclosure.
Figure 6:
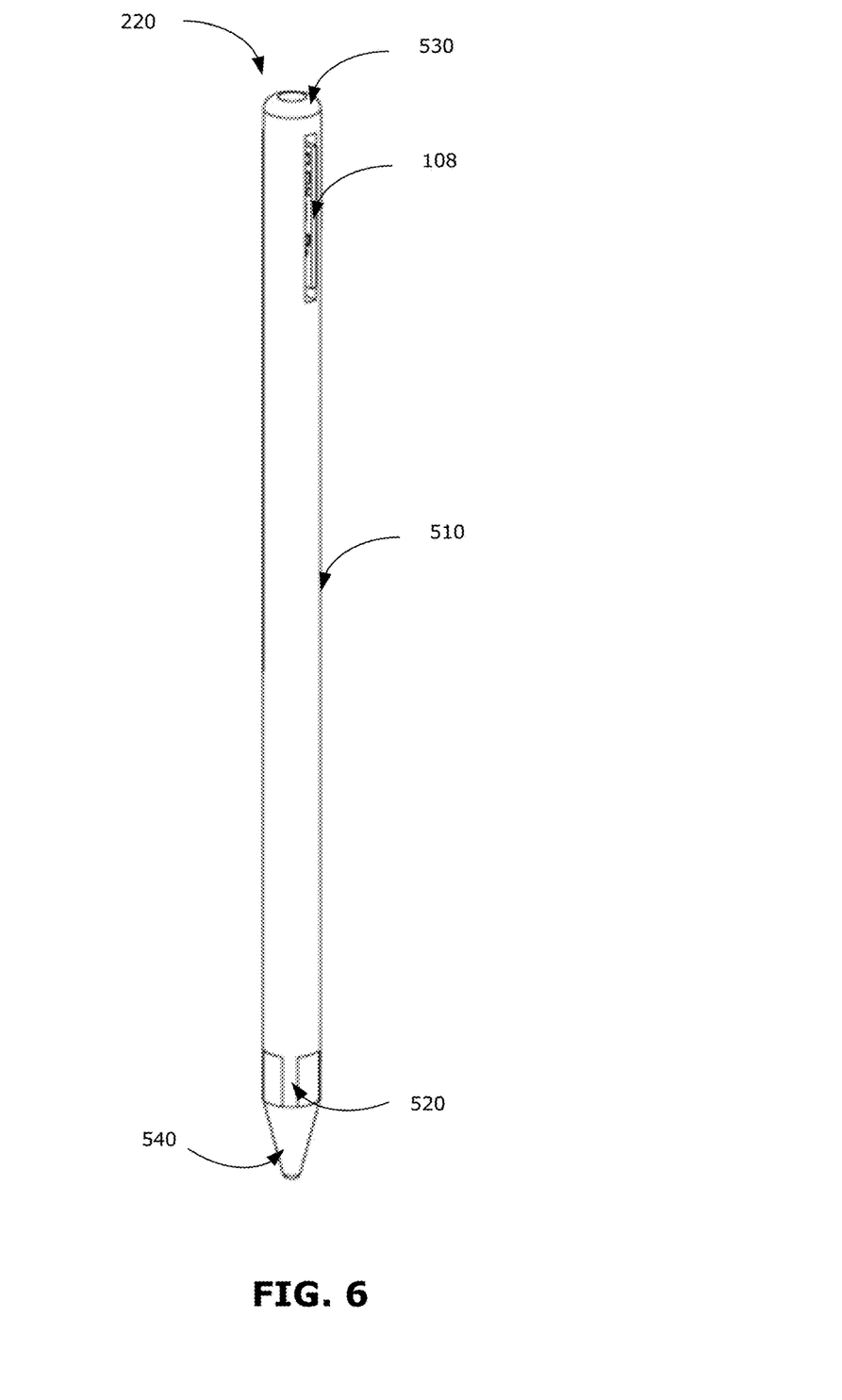
FIG. 6 is a perspective view of an example embodiment of a motion sensing device, configured for continuous sampling, in accordance with examples of the present disclosure.

According to embodiments of the present disclosure, a motion sensing device 220 for capturing hand motion 210 is provided. In some examples, the motion sensing device 220 includes a motion sensor 108 and configured to interact with a computing system 100 and a user to instruct command actions 290. In some examples, the motion sensing device 220 may be held in a user's hand 202 while the user is simultaneously interacting with a contact surface 240 to instruct command actions 290. FIGS. 5 and 6 illustrate an example motion sensing device 220 according to example embodiments. In some examples, the motion sensing device 220 may take the form of a digital pen or a stylus, having a rigid body 510 that extends as a shaft along an elongate axis from a first axial end 520 to a second axial end 530 or the motion sensing device 220 may be another device. In example embodiments, a motion sensing device 220 may have a body 510 that is configured to allow a user to grip the digital pen and the body 510 may be cylindrical along its length. In some examples, the motion sensing device 220 may have a tapered tip 540 provided at the first axial end 520 of the body 510. In some examples, the tip 540 may be used to actuate user-interface elements on a touchscreen display. In other examples, the motion sensing device 220 may incorporate a writing pen. For example, the motion sensing device 220 may have an ink-dispensing writing tip at the tip 540. In some examples, a motion sensor 108 may be coupled to the motion sensing device 220, for example, the motion sensor 108 may be coupled to the second axial end 530 of the motion sensing device 220 or the motion sensor 108 may be coupled to another location on the motion sensing device 220. In some examples, positioning the motion sensor 108 at the second axial end 530 may have the advantage of capturing greater or more exaggerated translational or rotational movement while a user interacts with the motion sensing device 220. In some examples, motion data 230 captured by the motion sensing device 220 may be transmitted to the computing system 100 to be pre-processed or motion data 230 may be pre-processed at the motion sensing device 220 and pre-processed motion data 312 may be transmitted to the computing system 100.

FIG. 5 is a perspective view of an example embodiment of a motion sensing device 220 in the form of a digital pen, configured for delimited sampling, in accordance with examples of the present disclosure. In some examples, a delimiter button 550 may be located on motion sensing device 220, for example the delimiter button 550 may be located on the body 510 of the motion sensing device 220. In some examples, the delimiter button 550 may be located near the first axial end 520 of the body 510 or it may be located elsewhere on the motion sensing device 220. In some examples, the delimiter button 550 is configured to interact with the computer system 100 to determine that a "button interaction" has occurred, in order to initiate or end data sampling. In some embodiments, for example, a user may instruct the motion sensing device 220 to begin sampling motion data 230 by depressing the delimiter button 250 in a single "button click", and in response to receiving instruction to begin sampling motion data 230, the motion sensing device 220 may sample the motion data 230 for a pre-determined period of time, for example, 3 seconds. In other embodiments, for example, the user may instruct the motion sensing device 220 to begin sampling motion data 230 by depressing the delimiter button 250 in a first single "button click", and in response to receiving instruction to begin sampling motion data 230, the motion sensing device 220 may sample the motion data 230 until an instruction is received to end the sampling period, for example, by the user depressing the delimiter button 250 in a second "button click". In other embodiments, for example, the user may instruct the motion sensing device 220 to begin sampling motion data 230 by depressing and holding the delimiter button 250 in a depressed condition, the motion sensing device 220 continuing to sample the motion data 230 until the delimiter button 250 is released by the user, signaling an end to the data sampling period. In other embodiments, for example, the multimodal hand motion state network 260 may be trained to recognize the end of a hand gesture, and the user may instruct the motion sensing device 220 to begin sampling motion data 230 by depressing the delimiter button 250 in a single "button click", and in response to receiving instruction to begin sampling motion data 230, the motion sensing device 220 may sample the motion data 230 until the multimodal hand state network 260 recognizes that the hand gesture is complete and instructs the end to the data sampling period. In some examples, the motion sensing device 220 is synchronized with the contact surface 240 and instructions received at the motion sensing device 220 to initiate or end data sampling are also received at the contact surface 240 to initiate or end data sampling at the contact surface 240. In some embodiments, for example, the sampled motion data may be stored as motion data 230.

FIG. 6 is a perspective view of an example embodiment of a motion sensing device 220 in the form of a digital pen, configured for continuous sampling, in accordance with examples of the present disclosure. In some examples, the delimiter button 550 described with respect to FIG. 5 may be absent in a motion sensing device 220 configured for continuous sampling. In some examples, when the hand motion prediction system 200 is configured for continuous sampling, no explicit instruction may be provided to the motion sensing device 220 or the contact surface 240 by the user, signaling the start or the end of sampling, and the motion sensing device 220 and the contact surface 240 may be continuously sampling motion data at all times and generating a stream of sampled motion data and sampled contact data. In some embodiments, for example, a control operator within the computing system 100 may monitor the sampled motion data 230 and the sampled contact data 250 to detect the start of a hand action 210. For example, a control operator within the computing system 100 may compare the motion data and contact data values to a threshold level to signal the start or the end of sampling, for example, a threshold level of translational or rotational motion by the motion sensor 108 that indicates that the motion sensing device 220 is in motion, or a non-zero measure on the touch sensor 110 or the force sensor 112 that indicates that a user's hand 202 is in contact with the contact sensor 240. In some embodiments, for example, if a motion sensing device 220 is deemed to be in motion, a control operator may initiate data sampling for the motion sensing device 220 and the contact surface 240 for a pre-determined period of time, for example, 3 seconds. In some examples, the control operator may repeat the initiation of data sampling in rolling windows of pre-determined length, (e.g. 3 seconds) until an indication has been received that the hand action 210 has ended. In other embodiments, for example, the multimodal hand state network 260 may be trained to recognize the beginning or the end of a hand action 201, for example, a gesture, and may segment discrete portions of the continuous motion data 230 and the continuous contact data 250 for processing and classification. In some embodiments, for example, the continuously sampled motion data may be stored as motion data 230.

Although some examples have been described in the context of a handheld electronic device (e.g., a tablet, or a smartphone), it should be understood that examples of the present disclosure may be implemented using other electronic devices, such as electronic wearable devices including smart watches or smart gloves, among others. For example, motion sensors 108 can be mounted on the surface of a wearable device, such as a smart watch to capture wrist movement. In other examples, a touch sensor 110 or a force sensor 112 may be integrated into a vehicle, for example, on the steering wheel or console screen, for human-computer interaction during driving.

In another example embodiment, the methods, systems and devices described herein may be used to predict a multimodal hand state 270 by modeling a user's hand posture in 3D space, rather than classifying a gesture or a gripping posture. In some examples, a modeling method to model a user's hand posture in 3D space may include a 3D skeletal model, or another modeling method may be used. In some examples, the multimodal hand state 270 may be a real-time 3D skeletal representation of a user's hand in 3D space, for example, a 3D skeleton model may map, in real-time, coordinates corresponding to one or more skeletal features to a shape, position or posture of a user's hand. In some examples, to model a user's hand posture in 3D space, motion data 230 and contact data 250 may be optionally augmented by additional inputs, for example, a peripheral contact surface that is operatively coupled to the exterior of the motion sensing device 220 that is configured to sense peripheral contact of the user's hand on the motion sensing device 220 while the user is holding the motion sensing device 220. In some examples, the peripheral contact surface may be a touch sensitive surface or a pressure array coupled to the exterior of the motion sensing device 220. In some examples, the peripheral contact surface may capture peripheral contact data corresponding to surface area or applied force caused by the user's fingers or hand contacting the exterior of the motion sensing device 220 while executing a gripping posture or a gesture. In some examples, the peripheral contact data may be processed to generate a peripheral contact output representing a peripheral contact state based on the peripheral contact data. In some examples, the peripheral contact output may be fused with the first output 322 and the second output 342 to generate a second fused output, and where the second fused output may be processed to generate the multimodal hand state 270. In some examples, an additional input may be a camera for capturing images or point data related to the position of the user's hand in 3D space. In some examples, modeling the user's hand motion in 3D space takes place in real-time, for example, with motion data 230, contact data 250 and optionally, peripheral contact data or camera data being continuously sampled, and the hand state prediction system 200 continuously re-processing and updating the generated multimodal hand state 270 as new input data is received. In some examples, a modeled hand position may be output to an application on an electronic device (e.g., a software application executed by the computing system 100) to estimate a deviation in a modeled gripping posture from a target gripping posture. For example, if the application on the electronic device is an assistive tool to support children during early age development, obtaining accurate estimates of a modeled gripping posture may prompt or assist children in learning or modifying their grip to more correct postures.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable an electronic device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
    obtaining motion data from a digital pen device that is configured to sense motion of a user's hand;
    obtaining contact data from a contact surface that is configured to sense contact of the user's hand, the contact data being representative of the motion of the user's hand and the contact surface including a capacitive touch surface;
    obtaining peripheral contact data from a peripheral contact surface operatively coupled to the digital pen device, that is configured to sense peripheral contact of the user's hand on the digital pen device;
    generating a multimodal hand state based on a fusing of the motion data, the contact data and the peripheral contact data; and
    applying the multimodal hand state to determine when a hand action occurs.

2. The method of claim 1, comprising:
    prior to obtaining the motion data and contact data:
        receiving an instruction to begin sampling the motion data, and when the instruction to begin sampling the motion data is received, sampling the motion data;
        receiving an instruction to begin sampling the contact data, and when the instruction to begin sampling the contact data is received, sampling the contact data;
        receiving an instruction to end sampling the motion data;
        receiving an instruction to end sampling the contact data;
        storing the sampled motion data as the motion data; and
        storing the sampled contact data as the contact data.

3. The method of claim 1, comprising:
    prior to obtaining the motion data and contact data:
        continuously sampling the motion data and the contact data;
        determining, based on a threshold corresponding to the continuously sampled motion data and a threshold corresponding to the continuously sampled contact data, when a start of the hand action occurs;
        determining when an end of the hand action occurs based on the start of the hand action occurring;
        extracting the sampled motion data from the continuously sampled motion data based on the start of the hand action and the end of the hand action;
        extracting the sampled contact data from the continuously sampled contact data based on the start of the hand action and the end of the hand action;
        storing the sampled motion data as the motion data; and
        storing the sampled contact data as the contact data.

4. The method of claim 1, further comprising:
    transforming the multimodal hand state into a command action based on a predefined set of commands.

5. The method of claim 1, wherein the digital pen device includes an inertial measurement unit (IMU).

6. The method of claim 1, wherein the contact data captured by the contact surface is 2D contact data.

7. The method of claim 1, wherein the contact surface includes a pressure sensor pad, the contact data captured by the contact surface being 3D contact data.

8. The method of claim 1, wherein the multimodal hand state is a classification prediction corresponding to one or more classes of hand actions.

9. The method of claim 1, wherein the multimodal hand motion state is a real-time 3D skeletal representation of a user's hand in a 3D space.

10. The method of claim 1, wherein generating the multimodal hand state comprises:
    pre-processing the motion data to generate pre-processed motion data; and
    classifying the pre-processed motion data using a trained motion classifier to generate a first output, the first output including a probability corresponding to one or more classes.

11. The method of claim 10, wherein generating the multimodal hand state further comprises:
    pre-processing the contact data to generate pre-processed contact data; and
    classifying the pre-processed contact data using a trained contact classifier to generate a second output, the second output including a probability corresponding to one or more classes.

12. The method of claim 11, wherein generating the multimodal hand state further comprises:
    concatenating the first output and the second output to generate a fused output.

13. The method of claim 12, wherein generating the multimodal hand state further comprises:
- classifying the fused output using a trained multimodal classifier to generate the multimodal hand state, the multimodal hand state including a probability corresponding to one or more classes.

14. A system comprising:
- a digital pen device that is configured to sense motion of a user's hand and output corresponding motion data;
- a contact surface that is configured to sense contact of the user's hand and output corresponding contact data, the contact data being representative of the motion of the user's hand and the contact surface including a capacitive touch surface;
- a peripheral contact surface coupled to the digital pen device, that is configured to sense peripheral contact of the user's hand on the digital pen device;
- one or more memories storing executable instructions; and
- one or more processors coupled to the digital pen device, contact surface and one or more memories, the executable instructions configuring the one or more processors to:
  - generate a multi-modal hand state based on a fusing of the motion data, the contact data, and the peripheral contact data; and
  - apply the multimodal hand state to determine when a hand action occurs.

15. The system of claim 14, wherein the executable instructions, when executed by the one or more processors, further cause the system to:
- pre-process the motion data to generate pre-processed motion data; and
- classify the pre-processed motion data using a trained motion classifier to generate a first output, the first output including a probability corresponding to one or more classes.

16. The system of claim 15, wherein the executable instructions, when executed by the one or more processors, further cause the system to:
- pre-process the contact data to generate pre-processed contact data; and
- classify the pre-processed contact data using a trained contact classifier to generate a second output, the second output including a probability corresponding to one or more classes.

17. The system of claim 16, wherein the executable instructions, when executed by the one or more processors, further cause the system to:
- concatenate the first output and the second output to generate a fused output; and
- classify the fused output using a trained multimodal classifier to generate the multimodal hand state, the multimodal hand state including a probability corresponding to one or more classes.

18. The system of claim 14, wherein the executable instructions, when executed by the one or more processors, further cause the system to:
- prior to obtaining the motion data and contact data:
  - continuously sample the motion data and the contact data;
  - determine, based on a threshold corresponding to the continuously sampled motion data and a threshold corresponding to the continuously sampled contact data, when a start of the hand action occurs;
  - determine when an end of the hand action occurs based on the start of the hand action occurring;
  - extract the sampled motion data from the continuously sampled motion data based on the start of the hand action and the end of the hand action;
  - extract the sampled contact data from the continuously sampled contact data based on the start of the hand action and the end of the hand action;
  - store the sampled motion data as the motion data; and
  - store the sampled contact data as the contact data.

19. A non-transitory computer-readable medium having machine-executable instructions stored thereon which, when executed by one or more processors of a computing system, cause the computing system to:
- obtain motion data from a digital pen device that is configured to sense motion of a user's hand;
- obtain contact data from a contact surface that is configured to sense contact of the user's hand, the contact data being representative of the motion of the user's hand and the contact surface including a capacitive touch surface;
- obtain peripheral contact data from a peripheral contact surface operatively coupled to the digital pen device, that is configured to sense peripheral contact of the user's hand on the digital pen device;
- generate a multimodal hand state based on a fusing of the motion data, the contact data and the peripheral contact data; and
- apply the multimodal hand state to determine when a hand action occurs.

* * * * *